United States Patent [19]

Lawson et al.

[11] Patent Number: 5,210,144

[45] Date of Patent: May 11, 1993

[54] DIENE POLYMERS HAVING REDUCED HYSTERESIS AND IMPROVED RAW VISCOSITY INCORPORATING PRIMARY PARTIAL COUPLING AND FUSED-RING POLYNUCLEAR AROMATIC TERMINATORS

[75] Inventors: David F. Lawson, Uniontown; Mark L. Stayer, Jr., Mogadore; Thomas A. Antkowiak, Rittman, all of Ohio

[73] Assignee: Bridgestone Corporation, Tokyo, Japan

[21] Appl. No.: 812,172

[22] Filed: Dec. 20, 1991

[51] Int. Cl.⁵ ............................................. C08F 8/00
[52] U.S. Cl. ................................. 525/289; 525/290; 525/337.8; 525/332.9; 525/333.1; 525/333.2; 525/383
[58] Field of Search ............... 525/332.8, 332.9, 333.1, 525/333.2, 289, 290, 383

[56] References Cited

U.S. PATENT DOCUMENTS 4,297,451 10/1981 Uraneck et al. .................. 525/366

Primary Examiner—Bernard Lipman
Attorney, Agent, or Firm—Frank J. Troy, Sr.

[57] ABSTRACT

Diene polymers or copolymers having improved raw polymer viscosity and reduced hysteresis in the cured and carbon black reinforced state are provided. These diene polymers or copolymers comprise a mixture of diene polymer or copolymer chains containing carbon-tin bonds in the main polymer or copolymer chains and diene polymer or copolymer chains containing terminals derived from fused-ring polynuclear aromatic compounds.

The diene polymer or copolymers are prepared by first coupling a portion of the living diene polymer or copolymer chains obtained by anionic polymerization using a tin polyhalide coupling agent and then terminating the remaining living diene polymer or copolymer chains using fused-ring polynuclear aromatic compounds. The resultant diene polymers or copolymers have improved raw polymer viscosity and when compounded with carbon black and cured have reduced hysteresis properties. The polymers can be utilized to form elastomer compositions for tire treads having reduced rolling resistance.

28 Claims, No Drawings

DIENE POLYMERS HAVING REDUCED HYSTERESIS AND IMPROVED RAW VISCOSITY INCORPORATING PRIMARY PARTIAL COUPLING AND FUSED-RING POLYNUCLEAR AROMATIC TERMINATORS

BACKGROUND OF THE INVENTION

The invention relates to diene polymers or copolymers having improved raw polymer viscosity which are adapted to form elastomer compositions having reduced hysteresis properties and tire treads having reduced rolling resistance. More particularly, the invention relates to diene polymers or copolymers which comprise a mixture of diene polymer or copolymer chains containing carbon-tin bonds in the main polymer or copolymer chains and diene polymer or copolymer chains containing terminals derived from fused-ring polynuclear aromatic compounds.

In recent years, those active in the tire industry have greatly increased their emphasis on the development of tires having both reduced rolling resistance and good wet traction properties. As is well known, that portion of the tire which exerts the greatest influence on rolling resistance and traction is the tread or tread rubber portion. Low rolling resistance is desirable from a fuel consumption standpoint while good wet traction is desirable from a safety standpoint. However, as a general rule, these properties have been found to conflict with each other. Thus, a reduction in rolling resistance generally leads to an almost directionally proportional reduction in wet traction while an increase in wet traction generally leads to an almost directionally proportional increase in rolling resistance.

The prior art has proposed a number of approaches to the solution of this problem. Such approaches have generally involved modifying the properties of the elastomer or elastomer composition utilized to form the tire tread in order to achieve the best possible balance between rolling resistance and traction. The approaches involving modification of the elastomer have generally been based on improving the interaction between the elastomer and the carbon black used in compounding the elastomer to prepare the tire tread composition in order to improve the dispersion of the carbon black into the elastomer. This has the effect of reducing the hysteresis of the elastomer composition which in turn results in lower rolling resistance of the treads formed therefrom.

One known approach to modifying the diene polymer or copolymer elastomer to reduce the hysteresis of elastomer compositions formed therefrom involves coupling the living diene polymer or copolymer chains with metal halides. Thus, U.S. Pat. Nos. 4,383,085 and 4,515,922 describe the coupling of living diene polymer or copolymer chains obtained by anionic polymerization using an organolithium initiator with metal halides such as tin halides, silicon halides and the like. These patents indicate that tire treads formed from rubber compositions containing the coupled polymers have reduced hysteresis along with reduced rolling resistance and improved wet skid resistance.

Another known approach to modifying the diene polymer or copolymer elastomer to reduce the hysteresis of the elastomer composition involves terminating the living diene polymer or copolymer chains with certain compounds containing functional groups which are reactive with the lithium terminals of the living polymer. Thus, living diene polymers or copolymers have been terminated for that purpose by reaction with compounds such as carbodiimides, halogenated nitriles, heterocyclic nitrogen compounds, alkyl benzoates, certain substituted imines and organic acid halides as well as compounds containing

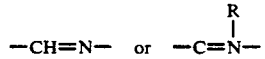

groups such as those represented by the formula:

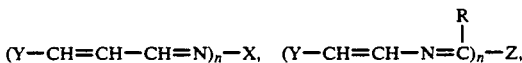

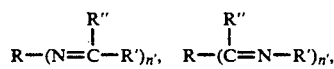

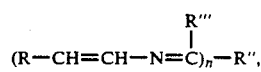

wherein X, Y, Z and the various R groups are organic groups such as aryl, substituted aryl, alkyl, substituted alkyl, cycloalkyl etc.

For example, U.S. Pat. No, 4,935,471 discloses a process for preparing a polydiene having a high level of affinity for carbon black which comprises reacting a metal terminated polydiene with a capping agent selected from the group consisting of (a) halogenated nitriles having the structural formula $X-A-C\equiv N$ wherein X represents a halogen atom and wherein A represents an alkylene group containing from 1 to 20 carbon atoms, (b) heterocyclic aromatic nitrogen containing compounds and (c) alkyl benzoates. The only halogenated nitrile compound specifically disclosed is chloroacetonitrile.

Diene polymer or copolymer elastomers containing a mixture of coupled polymer chains and certain terminally functionalized polymer chains and a method for their preparation are also known in the art. Thus, U.S. Pat. No. 4,616,069 discloses a process for making a diene polymer rubber which comprises reacting an active diene polymer rubber having alkali metal and/or alkaline earth metal terminals with: (1) a tin compound expressed by the general formula $R_aSnX_b$ (in which R stands for an alkyl, alkenyl, cycloalkyl or aromatic hydrocarbon group; X is a halogen atom, a is an integer of 0–2, and b is an integer of 2–4), and (2) at least one organic compound selected from the group consisting of aminoaldehydes, aminoketones, aminothioaldehydes, aminothioketones and the organic compounds having in their molecules

linkages in which A stands for an oxygen or sulfur atom.

Organic compounds containing such linkages which are disclosed include various amide compounds, imide compounds, lactam compounds, urea compounds, carbamic acid derivatives and the corresponding sulfur-containing compounds.

The patent discloses that the order of the reaction with the tin compounds (1) and organic compounds (2) is optional, i.e. they may be performed sequentially by optional order or they may be performed simultaneously. The reference further discloses that the rubber material of the invention shows well-balanced rolling resistance (rebound) and wet skid resistance and also good processability and storage stability.

Diene polymer and copolymer elastomers described in the aforementioned patents possess certain advantages in important properties such as reduced hysteresis (i.e. lower rolling resistance) and good traction and, in certain instances, good processability. However, those skilled in the rubber and tire art continue to seek polymers and rubber compositions having an excellent balance of such properties.

Summary of the Invention

In accordance with the present invention, diene polymers or copolymers and elastomers compositions are provided which exhibit an excellent balance of properties such as improved raw polymer viscosity and good compound viscosity in the uncured state and reduced hysteresis and lower rolling resistance in the cured state.

The diene polymers or copolymers comprise a mixture of:

a) from about 10 to about 70 percent by weight of a diene polymer or copolymer of a diene monomer and a vinyl aromatic hydrocarbon monomer containing carbon-tin bonds in the main polymer or copolymer chain; and b) from about 90 to about 30 percent by weight of a diene polymer or copolymer of a diene monomer and a vinyl aromatic hydrocarbon monomer containing terminals, formed by reacting living diene polymer or copolymer chains having organoalkali or organoalkaline earth metal terminals with a fused-ring polynuclear aromatic compound.

The diene polymers or copolymers are prepared by a method referred to as primary partial coupling which involves first coupling a portion of the living diene polymer or copolymer chains obtained by anionic polymerization with a tin polyhalide coupling agent and then terminating the remaining living polymer or copolymer chains with the fused-ring polynuclear aromatic compound.

Elastomer compositions of the invention may contain: (A) from 30 to 100 percent by weight of said diene polymers or copolymers and (B) from 0 to 70 percent by weight of a rubber selected from the group consisting of natural rubber, polybutadiene rubber, styrene-butadiene rubber and mixtures thereof.

DETAILED DESCRIPTION OF THE INVENTION

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be subjected to coupling and/or terminating reactions.

The term "hysteresis" as employed throughout the specification refers to the heat generating properties of a vulcanized elastomer or rubber composition. An art recognized measurement of the hysteresis of an elastomer composition is the tan delta value of the vulcanized composition. Low tan delta values at 50° to 65° C. are indicative of low hysteresis and, consequently, tires formed from such elastomer compositions have lower rolling resistance.

The diene polymers or copolymers of the invention are prepared by a process which involves first preparing a living diene polymer or copolymer containing active organoalkali or organoalkaline earth metal terminals by anionic polymerization of a conjugated diene monomer or mixture of a conjugated diene monomer and a vinyl aromatic hydrocarbon monomer, coupling a portion of the living diene polymer or copolymer chains by reacting the active terminals thereof with a tin polyhalide and then terminating the remaining portion of the living diene polymer or copolymer chains by reacting the active terminals thereof with a fused-ring polynuclear aromatic compound The living diene polymer is a polymer of a conjugated diene and the living diene copolymer is a random copolymer of a conjugated diene and a vinyl aromatic hydrocarbon.

Conjugated dienes which may be utilized in preparing the living polymers and copolymers include 1, 3-butadiene, 2-methyl-1,3-butadiene (isoprene), 2,3-dimethyl-1,3-butadiene, 1,3-pentadiene, 1,3-hexadiene and the like as well as mixtures thereof. The preferred diene is 1,3-butadiene.

Vinyl aromatic hydrocarbons which may be utilized in preparing the living copolymers include styrene, vinyl toluene, alpha-methyl styrene, vinyl naphthalene, vinyl pyridine and the like. The preferred vinyl aromatic hydrocarbon is styrene.

The living polymer can be prepared in a well known manner by polymerizing the monomer or monomers in a hydrocarbon solvent in the presence of an anionic initiator. In instances where it is desired to control the 1,2-microstructure of the diene polymer or copolymer and to effect randomization of the copolymer, this can readily be accomplished by including an appropriate polar modifier such as an ether or a tertiary amine in the polymerization mixture.

Anionic initiators which may be utilized in the preparation of the living polymers and copolymers may be any of the organoalkali metal initiators known in the art to be useful for the preparation of diene polymers and copolymers. The preferred initiators are organolithium initiators, especially the alkyllithium initiators. Suitable organolithium initiators which may be utilized include ethyllithium, n-butyllithium, tetramethylene dilithium, hexyllithium, cyclohexyl lithium, phenyllithium, tolyllithium and the like. A particularly preferred initiator is n-butyllithium.

It is also possible to employ as the anionic initiator an initiator formed by reacting a functionalizing agent with the above-described organolithium initiators. Thus, such initiators can be formed by reacting a functionalizing agent selected from the group consisting of substituted aldimines, ketimines and secondary amines with the organolithium compound. For example, an anionic initiator of this type can be formed by reacting a substituted aldimine such as dimethylamino benzylidene methylamine with n-butyllithium. A number of initiators of this type are described in our pending U.S. application Ser. No. 506,306 to Antkowiak et al filed Apr. 9, 1990, the disclosure of Which is incorporated herein by reference.

Hydrocarbon solvents which may be employed in the preparation of the living polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and cyclohexane.

Polar modifiers which may be utilized to control the 1,2-microstructure content of the living diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N',N'-tetramethylethylene diamine (TMEDA), dipiperidino ethane, and the like. The preferred polar modifiers are TMEDA and the oligomeric oxolanyl propanes.

The living random copolymers of conjugated dienes and vinyl aromatic hydrocarbons utilized to prepare copolymers of the invention may have diene contents of from about 99 to 20 percent by weight and vinyl aromatic hydrocarbon contents of from about 1 to about 80 percent by weight with the preferred copolymers having diene contents of from 90 to 50 percent by weight and vinyl aromatic hydrocarbon contents of from 10 to 50 percent by weight.

The living polymers of conjugated dienes and random copolymers of conjugated dienes and vinyl aromatic hydrocarbons employed to prepare the polymers and copolymers of the invention may have 1,2-microstructure contents ranging from about 10 to about 80 percent with the preferred polymers or copolymers having 1,2-microstructure contents of from 15 to 65 percent. The preparation of diene polymers or copolymers having a particular 1,2-microstructure content is dependent on a number of factors including the specific initiator, the type polar modifier, the modifier to initiator ratio and the polymerization temperature.

Ilustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerization", Journal of Polymer Science, Part A-1, Vol. 10, pages 1319-1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ratio and polymerization conditions necessary to obtain a living diene polymer or copolymer having the desired 1,2-microstructure content.

The diene polymers or copolymers containing carbon-tin bonds in the main polymer or copolymer chains are prepared by coupling the desired amount of living diene polymer or copolymer chains by reacting the alkali or alkaline earth metal terminals thereof with a tin polyhalide having the formula $R_aSnX_b$, wherein R is selected from the group consisting of alkyl, alkenyl, cyloalkyl and aryl groups, X is a halogen atom, a is an integer of 0-2 and b is an integer of 2-4.

Illustrative examples of tin polyhalides which may be employed include methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyltrichlorotin, phenyl trichlorotin, 1,2-bis (trichlorostannyl) ethane, 1,2-bis (methyldichlorostannyl) ethane, 1,4-bis (trichlorostannyl) butane, 1,4-bis (methyldichlorostannyl) butane and the like. The preferred tin polyhalides are tin tetrachloride and dibutyldichlorotin.

The coupling reaction is conducted by reacting the living polymers, preferably in solution in the hydrocarbon solvent in which they were prepared, with the tin polyhalide coupling agent. The reaction can be carried out if desired by simply adding the coupling agent per se to the polymer solution. However, it is generally preferred to add the coupling agent in the form of a solution thereof in an appropriate solvent for ease of handling.

The amounts of coupling agent added to the living polymer are dependent upon the amounts of live organoalkali metal end groups (e.g. live lithium end groups) present in the living polymer and the amount of coupled polymer desired in the finished polymer composition. It should be noted that the number of moles of live alkali metal end groups in the living polymer is presumed to be equivalent to the number of moles of alkali metal groups present in the organoalkali metal initiator utilized to effect polymerization. In general, the amount of tin polyhalide coupling agent employed to react with the live alkali metal end groups of the living polymer chains may range from about 0.1 to about 0.7 equivalents of tin polyhalide, based on the number of halogen atoms in said tin polyhalide, per mole of living polymer chains. However, preferred amounts of tin polyhalide range from 0.1 to 0.5 equivalents with 0.15 to 0.40 equivalents being especially preferred.

Temperatures employed in coupling the living polymer chains with the coupling agent may vary considerably and are selected with the basic criteria of preserving the live alkali metal end groups of the living polymer chains for reaction with the coupling agent and, subsequently, the terminating agent. Thus, the reaction temperatures may range from about 0.C to about 100 C with preferred temperatures ranging from 30.C to 100.C and especially preferred temperatures ranging from 50.C to 80.C. The reaction times may also vary somewhat and are, in general, dependent upon reaction temperatures. Hence, the reaction times may range from about 0.5 minutes to about 60 minutes with preferred reaction times ranging from 1 to 30 minutes.

The diene polymers or copolymers containing terminals derived from fused-ring polynuclear aromatic compounds are prepared by reacting the remaining living polymer or copolymer chains, preferably in solution, with the fused-ring polynuclear aromatic compound.

By the term "fused-ring" is meant a structure in which two or more benzene or other aromatic rings (or substituted aromatics, i.e. the higher dialkyl, aralkyl or aryl analogues) are joined together at more than one carbon; i.e. the rings share two or more carbons in common. The term "fused-ring" aromatic implies compounds with two or more rings. Although some reactive functional naphthalenes may be effective in the present invention, fused-ring aromatic systems having three or more rings are preferred; hence, the reference to fused-ring polynuclear aromatic compounds.

Fused-ring polynuclear aromatic compounds which may be employed include those having a suitably reactive functional group such as the keto or aldo carbonyl, pendent vinyl or reactive internal double bond including among others derivatives of anthracenes, benzanthrenes, phenanthrenes, benzphenanthrenes, pyrenes, benzopyrenes, benzanthracenes, benzoquinolines, and their higher fused-ring analogues, providing that sufficient solubility exists for reaction with living polymer. Fused-ring polynuclear aromatic compound derivates having reactive functional groups that can react with more than one mole of living polymer per mole of fused-ring compound should be avoided. Illustrative examples of suitable compounds include benzanthrone, 1-pyrenecarboxaldehyde, perinapthenone, phenanthrene -9-carboxaldehyde, vinyl phenanthrenes, 9-vinylanthracene, and the like. The preferred fused-ring polynuclear aromatic compound is benzanthrone.

The reaction of the living polymer in solution with the terminating agent ca be conducted if desired by simply adding the terminating agent per se to the polymer solution. However, it is generally preferred to add the terminating agent in the form of a solution thereof in an appropriate solvent for ease of handling.

The amounts of terminating agent added to the living polymer are dependent upon the amounts of live organoalkali metal end groups (e.g. live lithium end groups) present in the living polymer and the amounts of terminated polymer desired in the finished polymer composition. It will be noted that the number of moles of live alkali metal end groups in the living polymer is presumed to be equivalent to the number of moles of alkali metal groups present in the organoalkali metal initiator utilized to effect polymerization. In general, the amount of terminating agent employed to react with the live alkali metal groups of the living polymer chains may range from about 0.3 to about 100 moles of said terminating agent per mole of living polymer chains. However, the preferred amounts range from 0.4 to 2.0 moles of such terminating agent per mole of living polymer chains.

Temperatures employed in reacting the living polymer with the terminating agent may vary considerably and are selected with the basic criteria of preserving the live alkali metal end groups of the living polymer for reaction with the terminating agents. Thus, the reaction temperatures may range from about 0° C. to about 100° C. with the preferred temperatures ranging from 30° C. to 100° C. and especially preferred temperatures ranging from 50° C. to 80° C. The reaction times may also vary considerably and are, in general, dependent upon reaction temperatures. Hence, the reaction times may range from about 15 minutes to about 24 hours.

After the terminating reaction is complete, it is generally desirable to quench the polymer mixture in order to deactivate any live alkali metal end groups (e.g. lithium end groups) which may remain. This serves to prevent the living polymer from reacting with any carbon dioxide or oxygen which may be present. The quenching reaction can be conducted in known manner by adding a conventional polymer terminating agent such as water or an alcohol (e.g. isopropanol) to the polymer solution.

The resultant diene polymer or copolymer which contains a mixture of polymer containing carbon-tin bonds and polymer containing terminals derived from fused-ring polynuclear aromatic compounds may be recovered from the polymer solution and dried using conventional procedures. Thus, for example, the polymer mixture can be recovered from solution by direct drum drying, extruder drying, air drying or by coagulation either by adding a sufficient volume of a non-solvent liquid (e.g. an alcohol) for the polymer to the solution or, alternatively, by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

The diene polymers or copolymers of the invention may contain from about 10 to about 70 percent by weight of polymer or copolymer containing carbon-tin bonds and correspondingly from about 90 to about 30 percent by weight of polymer or copolymer containing terminals derived from fused-ring polynuclear aromatic compounds. However, the preferred compositions are those containing from about 15 to about 40 percent by weight of polymer or copolymer containing carbon-tin bonds and from about 50 to about 85 percent by weight of polymer or copolymer containing terminals derived from fused-ring polynuclear aromatic compounds.

It should be noted here that during the polymerization of the monomer(s) to prepare the living diene polymer or copolymers a minor proportion of living ends may be terminated with hydrogen or by loss of lithium hydride particularly in instances where the polymerization is conducted at high temperatures. Hence, the polymer compositions may contain minor proportions of such terminated polymers in addition to the diene polymers or copolymers of the invention.

As indicated, the elastomer compositions of the invention may contain (A) from 30 to 100 percent by weight of diene polymer or copolymer mixture consisting of diene polymer or copolymer containing carbon-tin bonds and diene polymer or copolymer containing terminals derived from fused-ring polynuclear aromatic compounds and (B) from 0 to 70 percent by weight of a rubber selected from the group consisting of natural rubber, polyisoprene, polybutadiene rubber, styrene-butadiene rubber or mixtures thereof. Such compositions can be prepared by compounding or mixing said diene polymer or copolymer composition component optionally with the other rubber component along with carbon black and other conventional rubber additives such as fillers, plasticizers, antioxidants, curing agents and the like using standard rubber mixing equipment and procedures. Such elastomer compositions when vulcanized using conventional rubber vulcanization conditions have reduced hysteresis properties and are particularly adapted for use as tread rubbers for tires having reduced rolling resistance.

The following examples are submitted for the purpose of further illustrating the nature of the present invention and should not be regarded as a limitation on the scope thereof. Parts and percentages shown in the examples are by weight unless otherwise indicated.

EXAMPLE 1

This example illustrates the preparation of diene copolymers and tread rubber compounds of the invention.

(A) Preparation of Living Random Copolymer of Butadiene/Styrene

A "living" medium vinyl butadiene/styrene copolymer was prepared in accordance with the following procedure:

To a stainless steel 5 gallon reactor equipped with a stirrer and thermometer and maintained under a nitrogen atmosphere was charged 0.68 lb (2.96 moles) of styrene, 2.72 lbs (22.88 moles) of 1,3-butadiene, 25.1 lbs of hexane, 8.1 millimoles (hereinafter abbreviated as mM) of N,N,N',N'-tetramethylethylene diamine (TMEDA) and 12.3 mM of n-butyllithium initiator. After addition of the ingredients was completed, the temperature of the reaction mixture was raised to 43. for about 3.5 hours with stirring under positive nitrogen pressure. A sample of the resultant living copolymer was quenched with isopropanol and drum dried to serve as a control (designated $C_1$ for convenience) for the copolymer of Example 1. For comparative purposes, a sample of copolymer coupled with tin polyhalide and terminated with isopropanol and a sample of copolymer terminated using benzanthrone were prepared to serve as additional controls (designated $C_2$ and $C_3$ respectively for convenience).

(B) Reaction of Living Copolymer to Form Copolymer Containing Mixture of Coupled and Terminated Copolymer Chains The living copolymer prepared in step (A) was sampled from the pressurized reactor through a needle into 28 ounce glass bottles (capped with three-holed caps and rubber liners) containing 0.3 equivalent (per equivalent of lithium) of the coupling agent, $SnCl_4$, added as a 1.08 Normal solution in hexane and the bottle contents were agitated and heated for 1.0 hours at 50° C. Then, 0.6 equivalents of the terminating agent benzanthrone added as a 0.25 molar solution in toluene, was charged to the bottles and the contents were agitated with heating at 50° C. for an additional 2 hour period. Thus, a total of 0.9 equivalents of combined reagents were utilized. The resultant copolymer solution was removed from the bottles, quenched with isopropanol, treated with an antioxidant, coagulated in isopropanol and then drum dried. Types and amounts of reagents employed are shown in Table I.

TABLE I

| | Coupling Agent | | Terminating Agent | |
|---|---|---|---|---|
| Example | Type | Amount (meq/mMLi) | Type | Amount (mM/mMLi) |
| $C_1$ | — | — | Isopropanol | — |
| $C_2$ | $SnCl_4$ | 0.9 | Isopropanol | — |
| $C_3$ | — | — | Benzanthrone | 0.9 |
| 1 | $SnCl_4$ | 0.3 | Benzanthrone | 0.6 |

The control copolymer, $C_1$, was analyzed by GPC, HNMR and DSC to determine molecular weight (Mw and Mn), molecular weight distribution (Mw/Mn), vinyl content (1,2-content), styrene content and glass transition temperature (Tg). Results were as follows:

| HSGPC(THF): | $M_n$ = 151,963 |
| | $M_w$ = 170,200 |
| | $M_w/M_n$ = 1.12 |
| NMR: | Styrene = 20.8% |
| | Vinyl Content = 62.5% (based on butadiene = 100) |
| | Tg = −28.1° C. |

C) Preparation of Tread Rubber Compounds

Prior to compounding, samples of the above copolymers were tested for Mooney Viscosity (ML/4/100° C.) in the raw or gum state, hereinafter referred to as Mooney Viscosity (gum). Samples of the copolymers were then compounded with carbon black and conventional rubber additives using a standard tread rubber formulation. The standard tread rubber compound had the following formulation:

| | Parts by Weight |
|---|---|
| Copolymer | 100.0 |
| Carbon Black | 55.0 |
| Process Oil | 10.0 |
| Zinc Oxide | 3.0 |
| Stearic Acid | 2.0 |
| Antioxidant | 1.0 |
| Wax | 2.0 |
| Sulfur | 1.5 |
| Accelerator | 1.0 |

The rubber compounds were mixed using conventional rubber mixing equipment and procedures. Samples of the resultant tread rubber compounds were tested for Mooney Viscosity (ML/4/100° C.), hereinafter Mooney Viscosity (cpd). Samples of tread rubber compounds were cured as 1.5"×4"×0.040" plaques for 35 minutes at 149° C. and cut into rings for stress-strain tests. Additional samples of compounds were cured for 40 minutes at 149° C. and tested for hysteresis (Tan delta) properties. Tan delta (hereinafter Tan δ) was determined at 50° C. using a Dynastat machine operating at a frequency of 1 Herz and 7% strain. Tan δ is a measure of the ratio of the loss modulus of the compound to the storage modulus and generally, as indicated above, the lower the value of Tan δ, the lower the hysteresis of the compound. Tests and test results are shown in Table II.

TABLE II

| | Copolymer Ex. | | | |
|---|---|---|---|---|
| | $C_1$ | $C_2$ | $C_3$ | 1 |
| Coupling Agent | — | $SnCl_4$ | — | $SnCl_4$ |
| Terminator | isopropanol | isopropanol | benzanthrone | benzanthrone |
| Mooney Viscosity (ML/4/100° C.) (gum) | 39.7 | 71.0 | 50.0 | 84.5 |
| Compound Properties | | | | |
| Mooney Viscosity (ML/4/100° C. cpd) | 68.0 | 80.5 | 80.5 | 85.0 |
| Tan-δ, 50° C. | 0.1514 | 0.1323 | 0.1131 | 0.1003 |
| % Δ, Tan δ* | — | −12.6 | −25.3 | −33.8 |
| Stress-Strain, R.T. | | | | |
| 300% Modulus, psi | 1961 | 2281 | 2226 | 2497 |
| Tensile, psi | 2871 | 3240 | 2648 | 2684 |
| Elongation @ Break, % | 470 | 457 | 398 | 366 |

*% change in Tan δ (minus values indicate reduction in Tan δ)

These results show greatly reduced Tan δ indicative of reduced hysteresis, in the polymer of Example 1 when compared with Example $C_1$, where there was no functional end group termination or coupling. Moreover, the hysteresis of Example 1 is considerably lower than that of Example $C_2$, which features only coupling through tin. As is also evident from the data, the Tan δ of Example C$_3$ which features only termination with benzanthrone although higher than the Tan δ of Example 1 nevertheless compares favorably to that of Example 1. However, although the compound ML/4 of Example C$_3$ is about the same as that of Example 1, the polymer of Example C$_3$ has a significantly lower raw polymer viscosity (i.e., about 50 ML/4) which renders its finishing somewhat more difficult. These examples show that the use of partial coupling in combination with the benzanthrone terminator is especially effective for achieving a desirable balance of high raw polymer viscosity, moderate compound viscosity and low hysteresis.

What is claimed is:

1. A method for preparing a diene polymer or copolymer having improved raw viscosity and adapted to form elastomer compositions having reduced hysteresis properties comprising the steps in sequence of:
   (a) preparing a living diene polymer or copolymer containing active organoalkali or organoalkaline earth metal terminals by anionically polymerizing a conjugated diene monomer or mixture of a conjugated dene monomer and vinyl aromatic hydrocarbon monomer in a hydrocarbon solvent using an organoalkali metal or organoalkaline earth metal initiator;
   (b) coupling from about 10 to about 70 percent by weight of the living diene polymer or copolymer chains by reacting the organoalkali or organoalkaline earth metal terminals thereof with from about 0.1 to about 0.7 equivalents of a tin polyhalide, based on the number of halogen atoms in said tin polyhalide, per mole of said living diene polymer or copolymer chains, said tin polyhalide having the general formula $R_aSnX_b$, wherein R is selected from the group consisting of alkyl, alkenyl, cycloalkyl and aryl groups, X is a halogen atom, a is an integer of 0–2 and b is an integer of 2–4; and
   (c) terminating the remaining living diene polymer or copolymer chains by reacting the organoalkali or organoalkaline earth metal terminals thereof with from about 0.3 to about 100 moles of a fused-ring polynuclear aromatic compound capable of reacting with no more than 1 mole of living polymer per mole of said fused-ring polynuclear aromatic compound.

2. The method of claim 1 wherein said living diene polymer or copolymer is a living polymer of butadiene or a copolymer of butadiene and styrene.

3. The method of claim 1 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

4. The method of claim 1 wherein said tin polyhalide is tin tetrachloride.

5. The method of claim 1 wherein said tin polyhalide is dibutyldichlorotin.

6. The method of claim 1 wherein said fused-ring polynuclear aromatic compound is selected from the group consisting of derivatives of anthracenes, benzanthrenes, phenanthrenes, benzphenanthrenes, pyrenes, benzopyrenes, benzanthracenes, benzoquinolines and higher fused-ring analogues.

7. The method of claim 1 wherein said fused-ring polynuclear aromatic compound is benzanthrone.

8. A diene polymer or copolymer composition comprising a mixture of:
   (a) from about 10 to about 70 percent by weight of a diene polymer or copolymer of a diene monomer and a vinyl aromatic hydrocarbon monomer containing carbon-tin bonds in the main polymer or copolymer chain; and
   (b) from about 90 to about 30 percent by weight of a diene polymer or copolymer of a diene monomer and a vinyl aromatic hydrocarbon monomer containing terminals formed by reacting living diene polymer or copolymer chains having organoalkali or organoalkaline earth metal terminals with a fused-ring polynuclear aromatic compound capable of reacting with no more than 1 mole of living polymer per mole of said fused-ring polynuclear aromatic compound.

9. The composition of claim 8 wherein said diene polymer is polybutadiene.

10. The composition of claim 8 wherein said copolymer is a copolymer of butadiene and styrene.

11. The composition of claim 8 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_aSnX_b$, wherein R is selected from the group consisting of alkyl, alkenyl, cycloalkyl and aryl groups, X is a halogen atom, a is an integer of 0–2 and b is an integer of 2–4.

12. The composition of claim 11 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

13. The composition of claim 11 wherein said tin polyhalide is tin tetrachloride.

14. The composition of claim 11 wherein said tin polyhalide is dibutyldichlorotin.

15. The composition of claim 8 wherein said fused-ring polynuclear aromatic compound is selected from the group consisting of derivatives of anthracenes, benzanthrenes, phenanthrenes, benzphenanthrenes, pyrenes, benzopyrenes, benzanthracenes, benzoquinolines and higher fused-ring analogues.

16. The compositions of claim 8 wherein said fused-ring polynuclear aromatic compound is benzanthrone.

17. An elastomer composition adapted for use in forming the treads of tires having reduced rolling resistance comprising:
   (A) from 30–100 percent by weight of a diene polymer or copolymer composition which comprises a mixture of:
      (a) from about 10 to about 70 percent by weight of a diene polymer or copolymer of a diene monomer and a vinyl aromatic hydrocarbon monomer containing carbon-tin bonds in the main polymer or copolymer chain; and (b) from about 90 to about 30 percent by weight of a diene polymer or copolymer of a diene monomer and a vinyl aromatic hydrocarbon monomer containing terminals formed by reacting living diene polymer or copolymer chains having organoalkali or organoalkaline earth metal terminals with a fused-ring polynuclear aromatic compound capable of reacting with no more than 1 mole of living polymer per mole of said fused-ring polynuclear aromatic compound; and (B) from 0–70 percent by weight of a rubber selected from the group consisting of natural rubber, polybutadiene rubber, styrene-butadiene rubber and mixtures thereof.

18. The elastomer composition of claim 17 wherein the diene polymer of component (A) is polybutadiene.

19. The elastomer composition of claim 17 wherein the diene copolymer of component (A) is a copolymer of butadiene and styrene.

20. The elastomer composition of claim 17 wherein said diene polymer or copolymer containing carbon-tin bonds is formed by coupling living diene polymer or copolymer chains by reacting the organoalkali or organoalkaline earth metal terminals thereof with a tin polyhalide having the general formula $R_aSnX_b$, wherein R is selected from the group consisting of alkyl, alkenyl, cycloalkyl and aryl groups, X is a halogen atom, a is an integer of 0–2 and b is an integer of 2–4.

21. The elastomer composition of claim 20 wherein said tin polyhalide is selected from the group consisting of methyltrichlorotin, dimethyldichlorotin, ethyltrichlorotin, diethyldichlorotin, butyltrichlorotin, dibutyldichlorotin, octyltrichlorotin, dioctyldichlorotin, methyltribromotin, dimethyldibromotin, octyltribromotin, tin tetrachloride, tin tetrabromide, tin tetraiodide, cyclohexyl trichlorotin, phenyl trichlorotin, 1,2-bis (trichlorostannyl) ethane, 1,2-bis (methyldichlorostannyl) ethane, 1,4-bis (trichlorostannyl) butane and 1,4-bis (methyldichlorostannyl) butane.

22. The elastomer composition of claim 20 wherein said tin polyhalide is tin tetrachloride.

23. The elastomer composition of claim 20 wherein said tin polyhalide is dibutyldichlorotin.

24. The elastomer composition of claim 17 wherein said fused-ring polynuclear aromatic compound is selected from the group consisting of derivatives of anthracenes, benzanthrenes, phenanthrenes, benzphenanthrenes, pyrenes, benzopyrenes, benzanthracenes, benzoquinolines and higher fused-ring analogues.

25. The elastomer composition of claim 17 wherein said fused-ring polynuclear aromatic compound is benzanthrone.

26. The method of claim 1 wherein said fused-ring polynuclear aromatic compound is selected from the group consisting of benzanthrone, 1-pyrenecarboxaldehyde, perinapthenon, phenanthrene-9-carboxaldehyde, vinylphenanthrenes and 9-vinylanthracene.

27. The diene polymer or copolymer composition of claim 8 wherein said fused-ring polynuclear aromatic compound is selected from the group consisting of benzanthrone, 1-pyrenecarboxaldehyde, perinaphthenone, phenanthrene-9-carboxaldehyde, vinylphenanthrenes and 9-vinylanthracene.

28. The elastomer composition of claim 17 wherein said fused-ring polynuclear aromatic compound is selected from the group consisting of benzanthrone, 1-pyrenecarboxaldehyde, perinapthenone, phenanthrene-9-carboxaldehyde, vinylphenanthrenes and 9-vinylvinylanthracene.

* * * * *